United States Patent
Han

(10) Patent No.: US 8,595,856 B2
(45) Date of Patent: Nov. 26, 2013

(54) APPARATUS AND METHOD FOR INSTALLING SOFTWARE

(75) Inventor: Hee-chul Han, Gangnam-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1652 days.

(21) Appl. No.: 11/704,937

(22) Filed: Feb. 12, 2007

(65) Prior Publication Data

US 2007/0240200 A1   Oct. 11, 2007

(30) Foreign Application Priority Data

Apr. 6, 2006   (KR) .................. 10-2006-0031652

(51) Int. Cl.
*G06F 21/00* (2013.01)

(52) U.S. Cl.
USPC ........................................... 726/29; 713/170

(58) Field of Classification Search
USPC .......... 717/174, 168, 175–178; 715/763–765, 715/846, 835; 726/29, 26; 713/170
See application file for complete search history.

(56) References Cited

U.S. PATENT DOCUMENTS

| | | | |
|---|---|---|---|
| 6,915,514 B1* | 7/2005 | Machida | 717/174 |
| 2004/0083473 A1* | 4/2004 | Thomas et al. | 717/174 |
| 2004/0088696 A1 | 5/2004 | Kawano et al. | |
| 2005/0125736 A1* | 6/2005 | Ferri et al. | 715/747 |
| 2005/0229171 A1* | 10/2005 | Henry et al. | 717/168 |
| 2006/0037015 A1* | 2/2006 | Mihai | 717/176 |
| 2006/0218549 A1* | 9/2006 | Hsu et al. | 717/174 |
| 2007/0168292 A1* | 7/2007 | Jogand-Coulomb et al. | 705/52 |

FOREIGN PATENT DOCUMENTS

| | | |
|---|---|---|
| EP | 1560098 A2 | 8/2005 |
| JP | 2001-184105 A | 7/2001 |
| KR | 10-2003-0043502 A | 6/2003 |

* cited by examiner

*Primary Examiner* — Edward Zee
(74) *Attorney, Agent, or Firm* — Sughrue Mion, PLLC

(57) ABSTRACT

An apparatus and method for installing a software package are provided. The apparatus includes a storage unit which stores a software package used to operate the apparatus by a digital device and authentication information used for an authentication by the digital device, a receiving unit which receives the result of authentication about the authentication information from the digital device, and a transmitting unit which uploads the software package to the digital device according to the received result of the authentication.

24 Claims, 6 Drawing Sheets

APPARATUS AND METHOD FOR INSTALLING SOFTWARE

CROSS-REFERENCE TO RELATED APPLICATION

This application is based on and claims priority from Korean Patent Application No. 10-2006-0031652 filed on Apr. 6, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to a digital apparatus and, more particularly, to easily uploading software of a digital apparatus.

2. Description of the Related Art

A home network market has appeared in response to the demand for home PCs, multimedia content via the Internet and data sharing. A home network involves communication among two or more digital devices. The current home network includes an audio/visual (AV) network for multimedia data transmission between a personal computer (PC) network, which connects several peripheral devices and shares use of the Internet with the PC as the central figure, and AV appliances such as a video and a television (TV), or a living network for automatically controlling conventional appliances such as a washing machine, a refrigerator, and an air conditioner, and energy such as power or water supply.

Digital devices included in the home network can be largely divided into peripheral devices such as a digital video disc (DVD) player and a personal video recorder (PVR), and a main device, which controls the peripheral device, connected to the peripheral device such as a digital TV and an Internet Protocol Television (IPTV).

In order to operate the peripheral device connected to the main device, a device driver and software required to operate the peripheral device should be installed in the main device. For example, when a camera for a motion game or a display phone is connected to a digital TV, the device driver and software required to operate the camera should be installed in the digital TV.

In the related art, a user had to directly install a device driver and software in a main device by using a portable storage media in which the device driver and the software required to operate a peripheral device were stored. In the case of the main device connected to an IPTV, the device driver and software required to operate the peripheral device could be installed in the IPTV through the Internet.

However, those methods are uncomfortable for those users who are poor at operating devices, and the device driver and the software required to operate the peripheral device can not be installed when the main device is disconnected from the Internet.

Various inventions have been made to solve the problems (for example, "An Apparatus for Upgrading Software in Home Appliances" disclosed in Korean Unexamined Patent Publication No. 2003-0064556). However, the problems have not been solved yet.

Therefore, a technology for easily uploading the device driver and any software required to operate peripheral device is required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for easily uploading software of a digital apparatus.

This and other objects, features and advantages, of the present invention will become clear to those skilled in the art upon review of the following description, attached drawings and appended claims.

According to an aspect of the present invention, there is provided an apparatus for installing a software package, the apparatus including: a storage unit which stores a software package used by a digital device to operate the apparatus and authentication information used by the digital device for an authentication of the apparatus, a receiving unit which receives the result of authentication about the authentication information from the digital device, and a transmitting unit which uploads the software package to the digital device according to the received result of the authentication.

According to another aspect of the present invention, there is provided a digital device for installing software, the digital device including an authentication unit which determines whether the received information of the authentication from an apparatus is valid, a transmitting unit which transmits the result of the determination to the apparatus, a receiving unit which receives a software package used to operate the apparatus as a response of the transmitted result of the determination, and an installation unit which installs the received software package.

According to still another aspect of the present invention, there is provided a method of installing software, the method including storing a software package used by a digital device to operate an apparatus and authentication information used by the digital device for an authentication of the apparatus, receiving the result of authentication about the authentication information from the digital device, and uploading the software package to the digital device according to the received result of the authentication.

According to yet another aspect of the present invention, there is provided a method of installing software, the method including determining whether the received information of the authentication from an apparatus is valid, transmitting the result of the determination to the apparatus, receiving a software package used to operate the apparatus as a response of the transmitted result of the determination, and installing the received software package.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF THE EXEMPLARY EMBODIMENTS OF THE INVENTION

Figure 1:
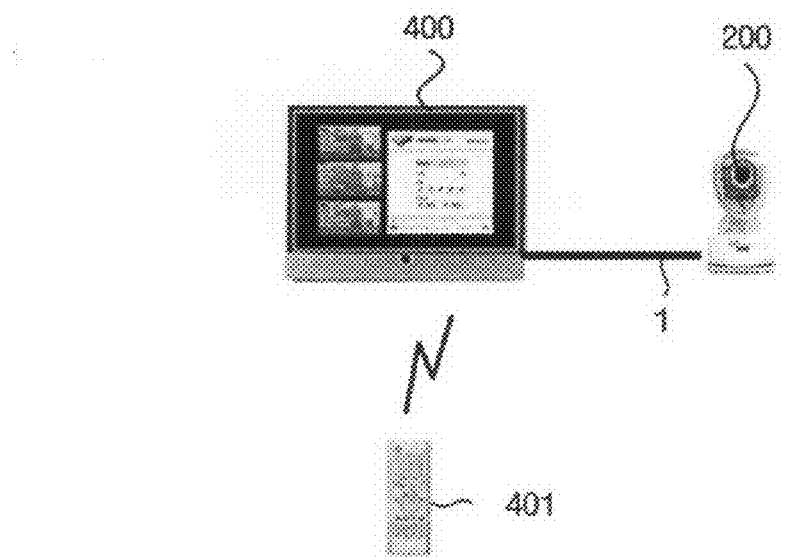
FIG. 1 illustrates a system for installing software according to an exemplary embodiment of the present invention.

Advantages and features of the aspects of the present invention and methods of accomplishing the same may be understood more readily by reference to the following detailed description of exemplary embodiments and the accompanying drawings. The aspects of the present invention may, however, be exemplarily embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to block diagrams or flowchart illustrations of a web service processing apparatus and system according to exemplary embodiments of the invention. It should be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed in the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

FIG. 1 illustrates a system for installing software according to an exemplary embodiment of the present invention. The illustrated system includes a peripheral device 200 and a main device 400.

The peripheral device 200 uploads a software package (see 300 in FIG. 3) to the main device 400, which is used by the main device 400 to operate the peripheral device 200. A camera and microphone are examples of the peripheral device 200. However, the peripheral device 200 is not limited thereto, and includes devices capable of providing content or a service linked to the main device 400. A detailed description of the peripheral device 200 will follow with reference to FIGS. 2 and 3.

The main device 400 receives the software package transmitted from the peripheral device 200, and installs a device driver and software included in the received software package 300. At this time, the main device 400 performs authentication with respect to the peripheral device 200, and only the device driver and the software relating to the authenticated peripheral device 200 can be installed in the main device 400. A personal computer (PC), a PC having a TV reception card in, a set top box (STB), a digital TV, and an internet protocol television (IPTV) can be exemplified as the main device 400. More detailed description of the main device 400 will follow with reference to FIGS. 4 and 5.

Figure 2:
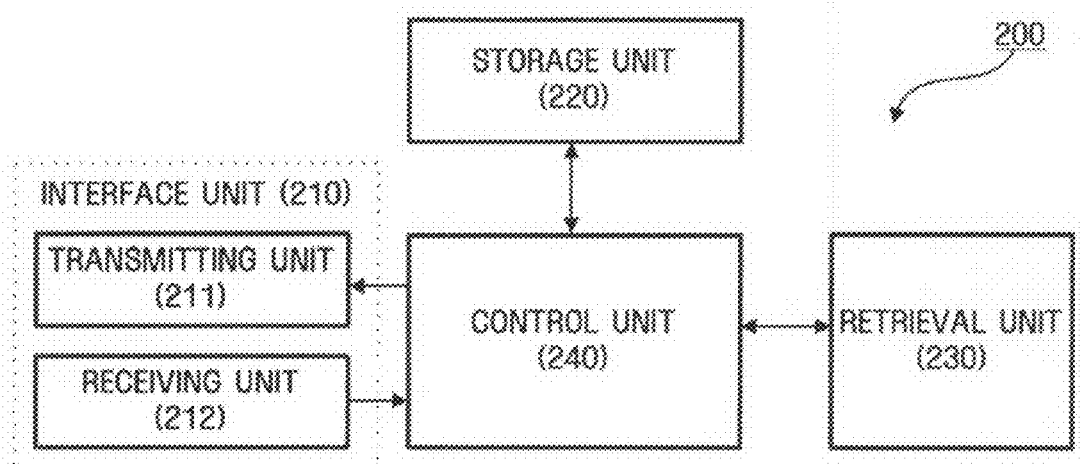
FIG. 2 is a flowchart illustrating configuration of a peripheral device in the system illustrated in FIG. 1.

FIG. 2 is a block diagram illustrating configuration of a peripheral device according to an exemplary embodiment of the present invention in the system illustrated in FIG. 1.

With reference to FIG. 2, the peripheral device 200 according to an exemplary embodiment of the present invention includes an interface unit 210, a storage unit 220, a retrieval unit 230, and a control unit 240.

The interface unit 210 performs a communication with the main device 400. For this, the interface unit 210 includes a transmitting unit 211 and a receiving unit 212. The transmitting unit 211 transmits the authentication information and the software package 300 previously stored in the storage unit 220 to the main device 400. The receiving unit 212 receives the result of the authentication with respect to the peripheral device 200 and an identification code of the main device 400 from the main device 400.

In order to communicate with the main device 400, the interface unit 210 can be connected to the main device 400 in a wired or wireless manner. When the interface unit 210 uses wired media to be connected to the main device 400, a wire communication protocol such as USB or IEEE 1394, can be used. When the interface unit 210 uses wireless media, a wireless communication protocol, such as Bluetooth, Wi-Fi, wireless USB, and wireless IEEE 1394, can be used. The interface unit 210 can perform communication with the main device 400 via a data transmission device such as an access point. The interface unit 210 can automatically sense the connection with the main device 400 using a device control protocol like universal plug and play (UPnP).

The storage unit 220 stores the authentication information of the peripheral device 200 and the software package 300 to be transmitted to the main device 400. The storage unit 220 can store a plurality of software packages 300 corresponding to the respective main devices 400 according to the types of the main device 400. The storage unit 220 can be implemented by a nonvolatile memory element, such as a cache, a read only memory (ROM), a programmable ROM (PROM), an erasable programmable ROM (EPROM), an electrically erasable programmable ROM (EEPROM), and a flash memory, a volatile memory element, such as a random access memory (RAM), or a hard disk, but the storage unit 220 is not limited thereto.

When the identification code of the main device 400 is received from the main device 400, the retrieval unit 230 searches for the software package 300 corresponding to the received identification code in the storage unit 220. The software package 300 found by the retrieval unit 230 is transmitted to the main device 400 via the interface unit 210.

The control unit 240 controls the operation of the components (210 to 230) included in the peripheral device 200. For example, when the control unit 240 is connected to the main device 400, it commands the authentication information stored in the storage unit 220 to be transmitted to the main device 400.

Figure 3:
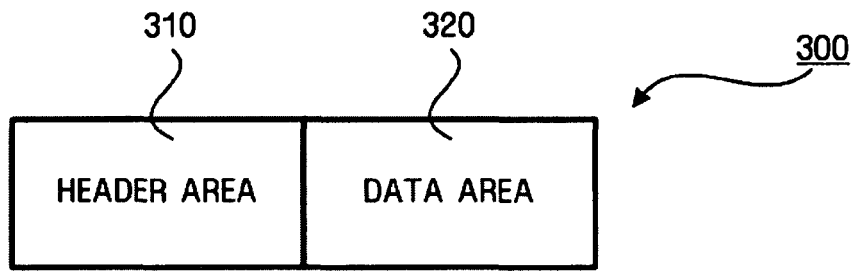
FIG. 3 is a diagram illustrating configuration of a software package transmitted from the peripheral device illustrated in FIG. 2.

FIG. 3 is a diagram illustrating configuration of a software package 300 stored in the storage unit 220 of the peripheral device 200 illustrated in FIG. 2.

The illustrated software package 300 includes a header area 310 and a data area 320.

The data area 320 includes a device driver that the main device 400 uses to operate the peripheral device 200, and other software. The device driver and the software of the peripheral device 200 can be recorded in the data area 320 compressed by a compression method.

The header area 310 includes the device driver recorded in the data area 320 and the software-related information. For example, the header area 310 can include a compression method code indicating which compression method is used to compress the device driver and the software, an installation address of the device driver, an installation address of the software, a name of the software, a software-related graphic data, and an identification code of the main device 400.

Figure 4:
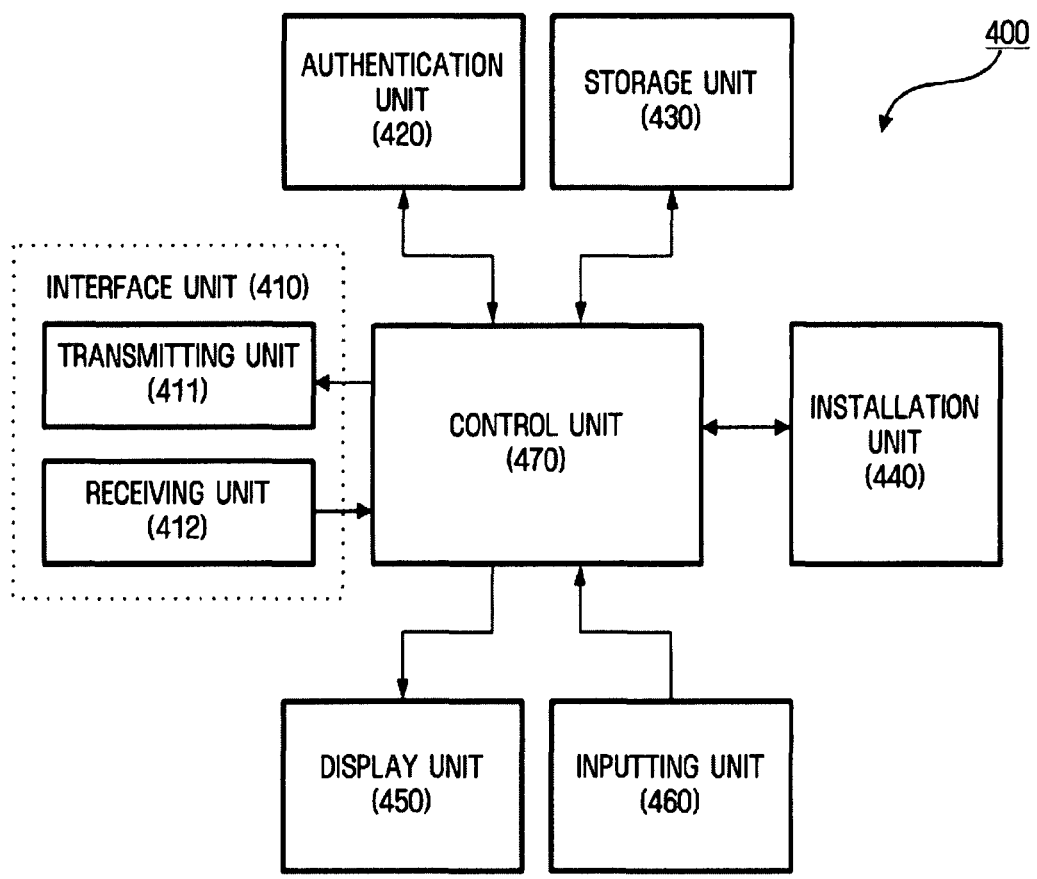
FIG. 4 is a flowchart illustrating configuration of a main device in the system illustrated in FIG. 1.

FIG. 4 illustrates configuration of the main device 400 according to an exemplary embodiment of the present invention.

The illustrated main device 400 includes an interface unit 410, an authentication unit 420, a storage unit 430, an installation unit 440, a display unit 450, an inputting unit 460, and a control unit 470.

The interface unit 410 performs a communication with the peripheral device 200. To accomplish the communication, the interface unit may include a transmitting unit 411 and a receiving unit 412. The transmitting unit 411 transmits the result of the authentication of the peripheral device 200 to the peripheral device 200. The receiving unit 412 receives the authentication information transmitted from the peripheral device 200 and the software package 300.

In order to communicate with the peripheral device 200, the interface unit 410 can be connected to the peripheral device 200 in a wired or wireless manner. When the interface unit 410 uses wired media to be connected to the peripheral device 200, a wired communication protocol such as USB or IEEE 1394, can be used. When the interface unit 410 uses wireless media, a wireless communication protocol, such as Bluetooth, Wi-Fi, wireless USB, wireless IEEE 1394, can be used. The interface unit 410 can perform a communication with the peripheral device 200 via a data transmission device like an access point. The interface unit 410 can automatically sense the connection to the peripheral device 200 using a device control protocol such as universal plug and play (UPnP).

The authentication unit 420 performs the authentication of the peripheral device 200. More specifically, when the authentication information is received, the authentication unit 420 compares the authentication information previously stored in the main device 400 and the received authentication information. As a result of the comparison, if both sets of authentication information are identical, the authentication unit 420 informs the peripheral device 200 that the authentication has been successfully achieved so that the software package 300 can be transmitted to the main device 400 from the peripheral device 200. If both sets of authentication information are not identical, the authentication unit 420 informs the peripheral device 200 that the authentication has failed so that the software package 300 cannot be transmitted to the main device 400 from the peripheral device 200.

The storage unit 430 stores the authentication information compared to the authentication information transmitted from the peripheral device 200, and an identification code of the main device 400. The identification code means the code indicating the types of the main device 400. The main device 400 includes identical or similar hardware types having authentication codes similar to one another. The authentication code is transmitted to the peripheral device 200 according to the request of the peripheral device 200. When the identification code of the main device 400 is transmitted to the peripheral device 200, the main device 400 can receive the software package 300 corresponding to the identification code from the peripheral device 200. At this time, the received software package 300 is stored in the storage unit 430. The storage unit 220 can be implemented by a nonvolatile memory element, such as a cache, a read only memory (ROM), a programmable ROM (PROM), an erasable programmable ROM (EPROM), an electrically erasable programmable ROM (EEPROM), and a flash memory, a volatile memory element, such as a random access memory (RAM), or a hard disk, but the storage unit 220 is not limited thereto.

The installation unit 440 analyzes the software package 300 received from the peripheral device 200, and installs the device driver included and the software in the received software package 300. The installation unit 440 also renews the menu information provided from the main device 400 when the installation of the device driver and the software is completed.

The display unit 450 displays the result of the control command in a visual form. For example, the display unit 450 may display a user interface including the menu information of the main device 400 and the menu information of the peripheral device 200. The description of the user interface provided from the main device 400 will follow with reference to FIG. 5.

The inputting unit 460 receives the control command from a user. For example, the inputting unit 460 may receive the command to operate a peripheral device 200, or to delete device driver and software of a specified peripheral device 200 among a plurality of peripheral devices 200 connected to the main device 400. The inputting unit 460 includes inputting means such as a key pad or a touch screen for this purpose. The inputting unit 460 may include an infrared receiver for receiving control commands of the user from a remote controller. (see 401 of FIG. 1)

The control unit 470 controls each of the component (410 to 460) included in the main device 400. For example, when a peripheral device 200 is connected to the main device 400, the control unit 470 determines whether the device driver and the software used to operate the connected peripheral device 200 are installed or not. As a result of the determination, if the device driver and the software used to operate the connected peripheral device 200 have been already installed, the control unit 470 operates the software related to the corresponding peripheral device 200. Otherwise, the control unit 470 continues the communication between the main device 400 and the peripheral device 200 so that the device driver and the software required to operate the peripheral device 200 can be installed in the main device 400.

Figure 5:
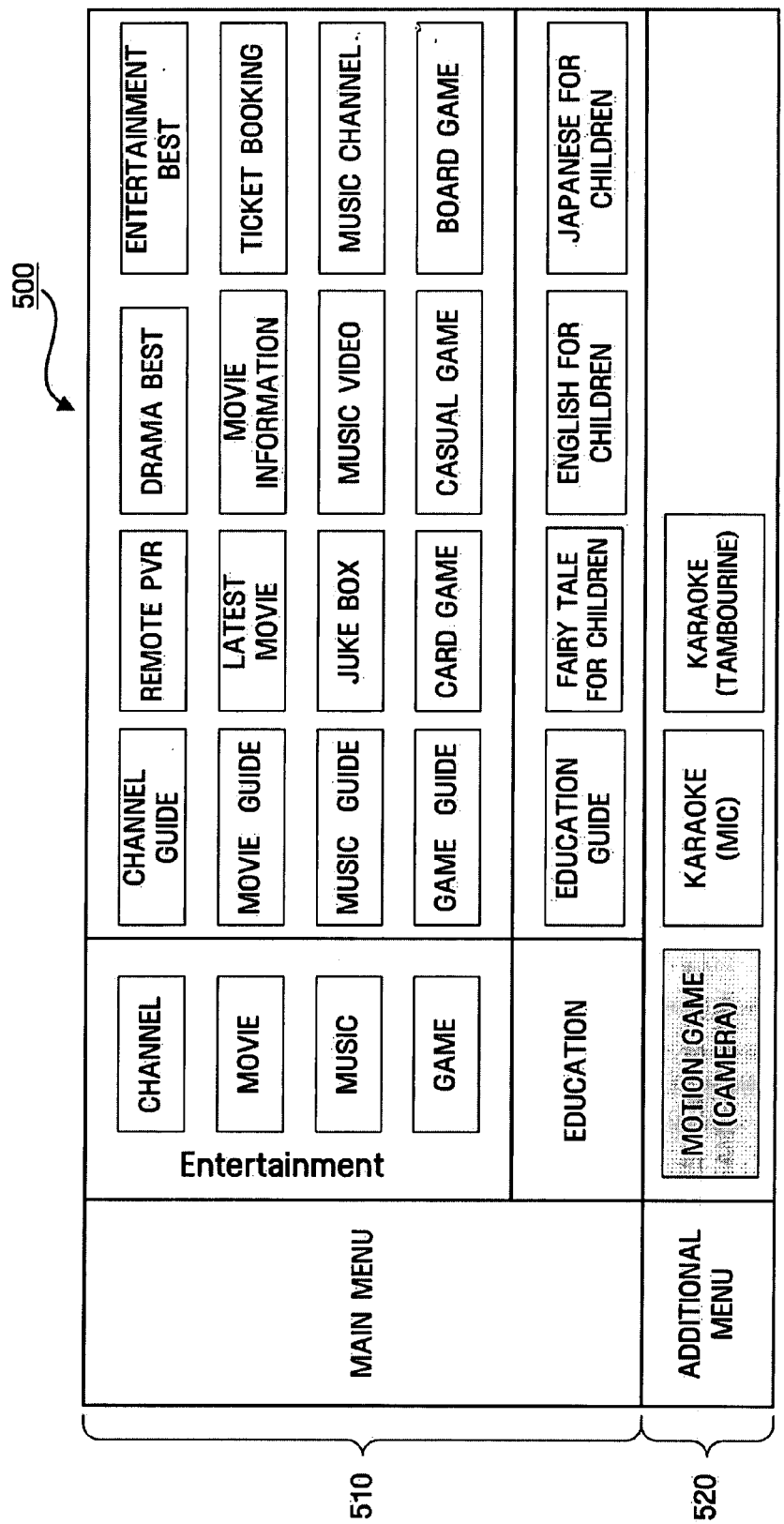
FIG. 5 is a diagram illustrating a user interface provided from the main device illustrated in FIG. 4.

FIG. 5 is a diagram illustrating a user interface 500 provided by the main device 400 illustrated in FIG. 4.

The user interface 500 illustrated in FIG. 5 includes a first area 510 and a second area 520. Here, a menu provided from the main device 400 is displayed in the first area 510, and icons respectively corresponding to a plurality of peripheral devices 200 are displayed in the second area 520. Each icon indicates the type of the peripheral device 200 corresponding to the icons, and a name of the software. Each icon also indicates the connection state between the peripheral device 200 corresponding to the icons and the main device 400. Property information of the icon like the color or degree of clearness can be used to indicate the connection state. For example, as illustrated in FIG. 3, the color of the icon corresponding to the peripheral device 200 currently connected to the main device 400 may be displayed as yellow, and the color of the icon corresponding to the peripheral device 200 currently not connected to the main device 400 may be displayed as white. The icons in the second area 520 can be deleted when the device driver and the software of the peripheral device 200 corresponding to each icon are deleted in the main device 400.

Meanwhile, the term "unit", used in FIGS. 2 and 4 means, but is not limited to, a software or hardware component, such as a Field Programmable Gate Array (FPGA) or an Application Specific Integrated Circuit (ASIC), which performs certain tasks. A "unit" may advantageously be configured to reside in the addressable storage medium and to execute on one or more processors. Thus, a "unit" may include, by way of example, components, such as software components, object-oriented software components, class components and task components, process, functions, attributes, procedures, subroutines, segments of program code, drivers, firmware, microcode, circuitry, data, databases, data structures, tables, arrays, and variables. The functionality provided for in the components and "unit" may be combined into fewer components and "unit" or further separated into additional components and modules.

Figure 6:
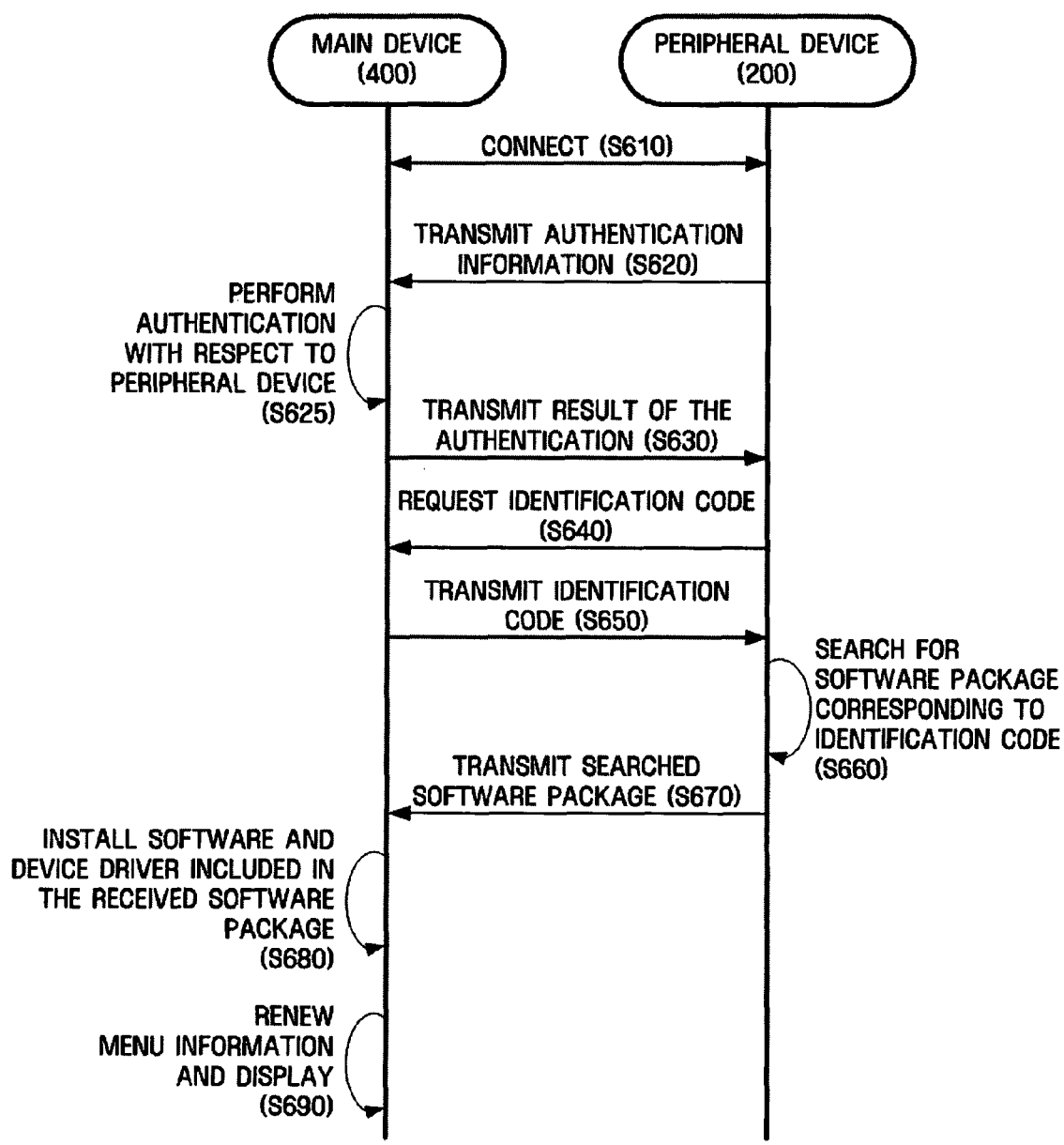
FIG. 6 is a conceptual diagram illustrating a method of installing software according to an exemplary embodiment of the present invention.

FIG. 6 is a conceptual diagram illustrating a method of installing software according to an exemplary embodiment of the present invention.

First, after a peripheral device 200 is connected to the main device 400 S610, the peripheral device 200 transmits the previously stored authentication information to the main device 400 S620.

When the authentication information is received from the peripheral device 200, the main device 400 performs the authentication with respect to the peripheral device 200 S625. When the authentication with respect to the peripheral device 200 has been successfully performed, the main device 400 transmits the result of the authentication to the peripheral device 200 S630.

Meanwhile, when the result of the authentication with respect to the peripheral device 200 is received from the main device 400, the peripheral device 200 requests the main device 400 to transmit an identification code of the main device 400 S640. The main device 400 transmits its identification code to the peripheral device 200 according to the request from the peripheral device 200 S650.

Then, when the identification code of the main device 400 is received from the main device 400, the peripheral device 200 searches for the software package 300 corresponding to the identification code of the main device 400 among a plurality of software packages 300 previously stored therein S660. Next, the peripheral device 200 uploads the searched software package 300 to the main device 400 S670.

When the software package 300 is received from the peripheral device 200, the main device 400 analyzes the received software package 300, and installs the device driver and the software included in the received software package 300 into the main device 400 S680. When the installation is completed, the icons corresponding to the peripheral device 200 that transmitted the software package 300 are generated. As a result, the menu information of the main device 400 is renewed. When the command to display the menu is input later, the user interface 500 including the renewed menu information is displayed through the display unit 450 S690.

Figure 7:
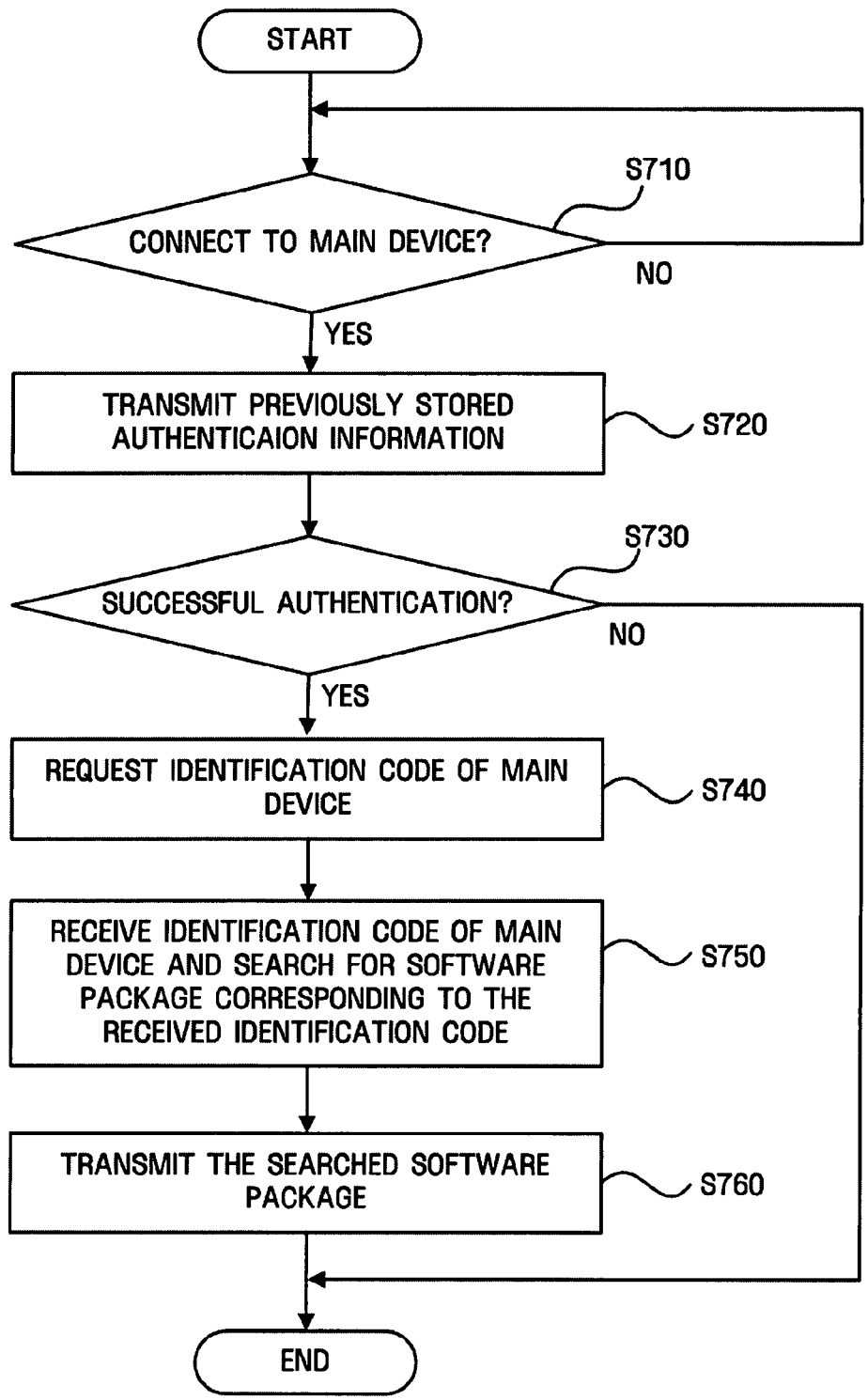
FIG. 7 is a flowchart illustrating operation of a peripheral device according to an exemplary embodiment of the present invention.

FIG. 7 is a flowchart illustrating operation of a peripheral device 200 according to an exemplary embodiment of the present invention.

First, the peripheral device 200 determines whether it is connected to the main device 400 S710. As a result of the determination, if it is connected to the main device 400 S710 (YES), the peripheral device 200 transmits the authentication information previously stored in the storage unit 220 to the main device 400 S720.

Next, when the result of the authentication is received from the main device 400, the peripheral device 200 determines whether the authentication with respect to the peripheral device 200 has been successfully performed S730.

As a result of the determination, if the authentication with respect to the peripheral device 200 has not been successfully performed S730 (NO), the peripheral device 200 completes the communication with the main device 400. If the authentication with respect to the peripheral device 200 has been successfully performed S730 (YES), the peripheral device 200 requests the main device 400 to transmit the identification code of the main device 400 to the peripheral device 200 S740.

Then, when the identification code of the main device 400 is received from the main device 400, the peripheral device 200 searches for the software package 300 corresponding to the received identification code among a plurality of software packages 300 previously stored in the storage unit 220 S750. Next, the peripheral device 200 transmits the searched software package 300 to the main device 400 S760.

Figure 8:
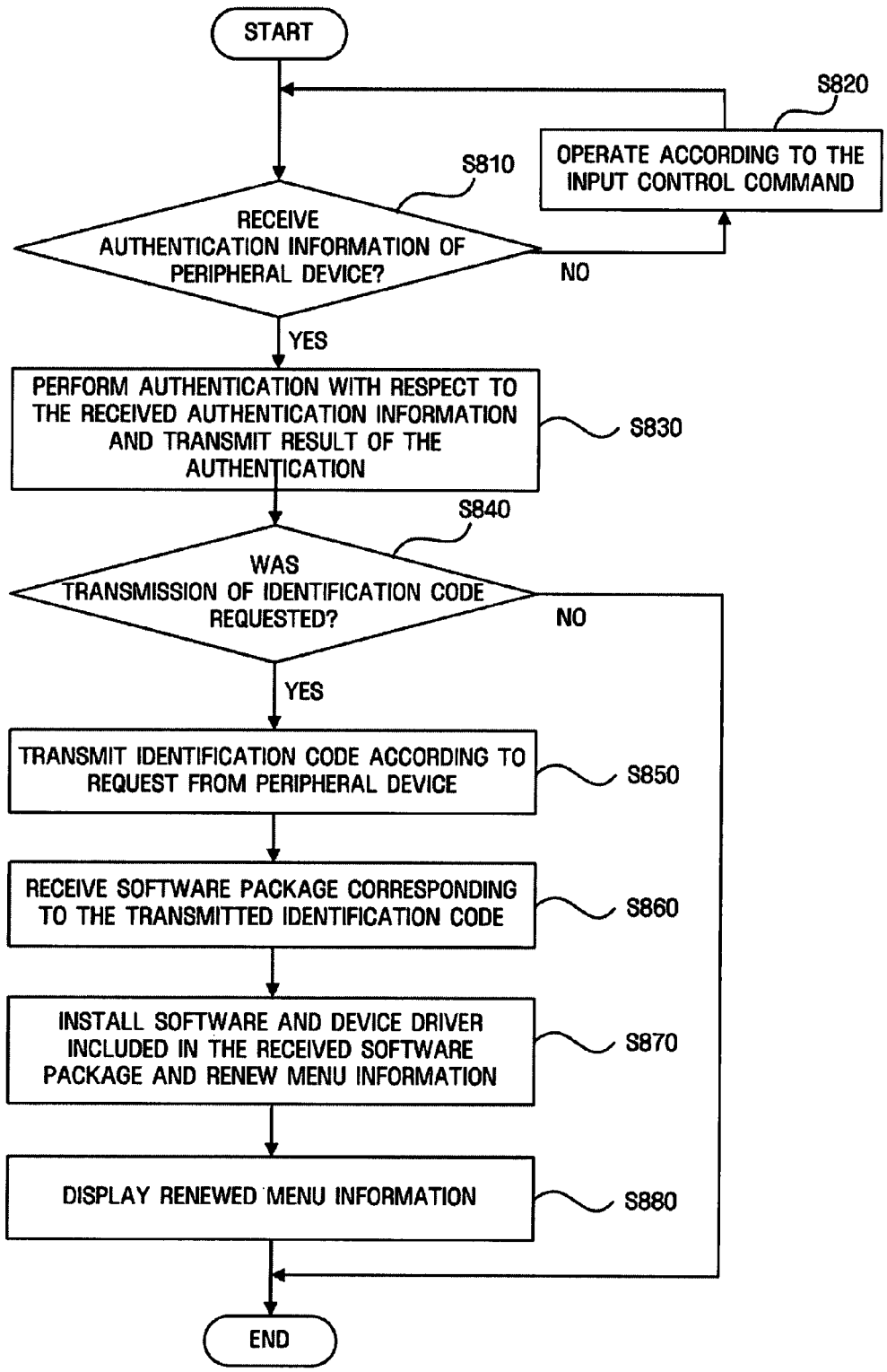
FIG. 8 is a flowchart illustrating operation of a main device according to an exemplary embodiment of the present invention.

FIG. 8 is a flowchart illustrating operation of a main device 400 according to an exemplary embodiment of the present invention First, the main device 400 determines whether the authentication information of the peripheral device 200 has been received from the peripheral device 200 S810. As a result of the determination, if the authentication information has not been received from the peripheral device 200 S810 (NO), the main device 400 performs the operation according to the control command input by the inputting unit 460. As a result of the determination, when the authentication information is received from the peripheral device 200 S810 (YES), the main device 400 performs the authentication with respect to the peripheral device 200 that transmitted the authentication information. Then, it transmits the result of the authentication to the peripheral device 200 S830.

Specifically, as a result of the comparison between the authentication information previously stored in the storage unit 430 and the received authentication information, if both authentication information is identical, the main device 400 informs the peripheral device 200 that the authentication has been successfully performed so that the software package 300 can be transmitted to the main device 400 from the peripheral device 200.

If both sets authentication information is not identical, the main device 400 informs the peripheral device 200 that the authentication has failed so that the software package 300 cannot be transmitted to the main device 400 from the peripheral device 200.

Meanwhile, in case of the successful authentication with respect to the peripheral device 200, when the request to transmit the identification code of the main device 400 is received from the peripheral device 200 S840 (YES), the main device transmits its identification code to the peripheral device 200 S850.

Next, when the software package 300 corresponding to the transmitted identification code is received from the peripheral device 200 S860, the main device 400 installs the device driver and the software included in the received software package 300 S870. At this time, the main device 400 installs the device driver and the software into the designated route with reference to the header area 310 of the received software package 300.

In S870, when the installation of the device driver and the software included in the received software package 300 is completed, the icons corresponding to the peripheral device 200 that transmitted the software package 300 are generated. As a result, the menu information of the main device 400 is renewed.

The renewed menu information is displayed by the display unit 450 of the main device 400 according to the control command input by the user later S880. For example, as illustrated in FIG. 5, the user interface 500 including the menu information of the main device 400, the information of the peripheral device 200, and the software information may be displayed. When the user interface 500 is displayed, the user can control the peripheral device 200 that the user wants to control by using a remote control 401.

As illustrated, when the peripheral device 200 is reconnected to the main device 400 in the state where the device driver and the software required to operate the peripheral device 200 are installed, the main device 400 can perform an application program with respect to the connected peripheral device 200. For example, if one of the peripheral devices 200 is a camera, the main device 400 can perform the application program related to the camera, such as a motion game.

According to an exemplary embodiment of the present invention, the apparatus and method for installing software has following effects;

First, the data required to operate an apparatus by a digital device can be easily uploaded.

Second, the data required by a digital device to operate an apparatus can be uploaded without use of the Internet.

Third, the data required by a digital device to operate an apparatus can be uploaded without any additional memory device.

The exemplary embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. An apparatus for installing software, the apparatus comprising:
   a memory which stores a software package used by a digital device to operate the apparatus, and authentication information that the digital device uses for an authentication of the apparatus;
   a receiving unit which receives the result of the authentication from the digital device, where the result is obtained by comparing by the digital device the authentication information from the memory with authentication information stored in the digital device; and
   a transmitting unit which uploads the software package to the digital device according to the received result of the authentication,
   wherein a controller controls operation of the transmitting unit such that any upload related information and upload related process which comprise uploading the software package to the digital device for execution of the software package by the digital device to operate the apparatus, are provided and executed by the transmitting unit after the received result of the authentication.

2. The apparatus of claim 1, wherein the software package comprises an apparatus driver, an application, and an identification code of the digital device.

3. The apparatus of claim 2, wherein the apparatus driver and the application included in the software package are compressed by a compression method.

4. The apparatus of claim 2, wherein the receiving unit receives the identification code from the digital device.

5. The apparatus of claim 4, further comprising a retrieval unit which searches for a software package corresponding to the received identification code among a plurality of software packages.

6. The apparatus of claim 1, wherein the software package comprises a header area and a data area and wherein the header area comprises at least one of identification code of a driver software code provided in the data area, compression method used to compress software code provided in the data area, installation address for the driver software code provided in the data area, installation address of the software code provided in the data area, name of the software code provided in the data area, and identification code of the digital device that identifies a type of the digital device.

7. The apparatus of claim 1, wherein, when the authentication results are provided to the receiving unit of the apparatus indicate that the apparatus is authenticated, a retrieval unit of the apparatus is configured to search for a driver which provides executable instructions necessary to control the apparatus by the digital device based on identification information about the digital device.

8. The apparatus of claim 7, wherein the digital device transmits said identification information only after the authentication results are provided to the receiving unit of the apparatus indicate that the apparatus is authenticated.

9. A digital device for installing software, the digital device comprising:
   an authentication unit which determines if authentication information received from an apparatus authenticates the apparatus;
   a communication interface connected to a communications network and comprising:
      a transmitting unit which transmits the result of the determination to the apparatus;
      a receiving unit which receives a software package used to operate the apparatus as a response of the transmitted result of the determination;
   an installation unit which installs the software package; and
   a display unit which displays at least one icon that represents a first application to be executed by a user, wherein the first application is obtained from the software package,
   wherein the display unit is separated into areas, the separation into areas is based on executing elements comprising the digital device and the apparatus such that the areas display separately second applications that can be executed by the digital device and at least one of the first application that can be executed by the apparatus.

10. The digital device of claim 9, wherein the software package comprises an apparatus driver, an application, and an identification code of the digital device.

11. The digital device of claim 10, wherein the installing unit upgrades a previously installed application or apparatus driver using the software package.

12. The digital device of claim 10, wherein the application and the apparatus driver included in the software package are compressed by a compression method.

13. The digital device of claim 9, wherein each of icons represent a respective one of the displayed applications, and wherein each of the icons further indicates a connection status of a respective apparatus that can execute the respective application to the digital device and a name of the respective application.

14. A method of installing software, the method comprising:
   storing a software package used by a digital device to operate an apparatus, and authentication information used by the digital device for an authentication of the apparatus;
   receiving the result of authentication from the digital device, where the result is obtained by comparing by the digital device the authentication information stored by the apparatus with authentication information stored in the digital device; and
   uploading the software package to the digital device according to the received result of the authentication, wherein the uploading comprises uploading the software package to the digital device for execution of the software package by the digital device to operate the apparatus,
   wherein any upload related information and upload related process of said uploading are provided and executed after the received result of the authentication.

15. The method of claim 14, wherein the software package comprises an apparatus driver, an application, and an identification code of the digital device.

16. The method of claim 15, wherein the apparatus driver and the application included in the software package are compressed by a compression method.

17. The method of claim 15, wherein the uploading comprises receiving the identification code from the digital device.

18. The method of claim 17, wherein the receiving comprises searching for a software package corresponding to the received identification code among a plurality of software packages.

19. A method of installing software, the method comprising:
   determining whether received information of an authentication from an apparatus authenticates the apparatus;
   transmitting the result of the determination to the apparatus;
   receiving a software package used to operate the apparatus as a response of the transmitted result of the determination;
   installing the received software package;
   displaying at least one icon that represents a first application to be executed by a user, wherein the first application is obtained from the software package; and
   displaying in separate areas, second applications that can be executed by the digital device and at least one of the first application that can be executed by the apparatus,
   wherein separation of the displaying into the separate areas is based on executing elements comprising the digital device and the apparatus.

20. The method of claim 19, wherein the software package comprises an apparatus driver, an application, and an identification code of the digital device.

21. The method of claim 20, wherein the installing comprises upgrading previously installed application or device driver by using the software package.

22. The method of claim 20, wherein the application and the apparatus driver included in the software package are compressed by a compression method.

23. The method of claim 20, wherein each of icons represent a respective one of the displayed applications, and wherein each of the icons further indicates a connection status of a respective apparatus that can execute the respective application to the digital device and a name of the respective application.

24. The method of claim 19,
   wherein the applications that can be executed by the digital apparatus are provided in a main menu area,
   wherein a respective application that can be executed by a respective apparatus is provided in an additional menu area dedicated to the respective apparatus, and
   wherein a respective icon for the respective application is generated if the received software package comprising a driver for the respective application is installed.

* * * * *